United States Patent [19]

Higuchi et al.

[11] 4,163,640
[45] Aug. 7, 1979

[54] APPARATUS FOR EXTRUDING A HONEYCOMB STRUCTURAL BODY

[75] Inventors: Noboru Higuchi, Nagoya; Shoji Futamura, Kawasaki, both of Japan

[73] Assignees: NGK Insulators, Ltd., Nagoya; Institute of Technology Precision Electrical Discharge Works, Kawasaki, both of Japan

[21] Appl. No.: 910,528

[22] Filed: May 30, 1978

[30] Foreign Application Priority Data

Jun. 10, 1977 [JP] Japan .................... 52-68711

[51] Int. Cl.² .............................................. B29F 3/06
[52] U.S. Cl. ................... 425/466; 264/176 R; 264/177 R; 425/197; 425/198
[58] Field of Search ............. 425/466, 467, 464, 197, 425/198, DIG. 229; 264/176, 177

[56] References Cited

U.S. PATENT DOCUMENTS

| 3,406,435 | 10/1968 | Dietzsch | 425/198 |
| 3,836,302 | 9/1974 | Kaukeinen | 425/197 |
| 3,905,743 | 9/1975 | Bagley | 425/464 |
| 3,947,214 | 3/1976 | Cunningham | 425/467 |
| 4,008,033 | 2/1977 | Folmar et al. | 425/467 |

Primary Examiner—William E. Schulz
Attorney, Agent, or Firm—Stevens, Davis, Miller & Mosher

[57] ABSTRACT

A die for extruding a honeycomb structural body capable of preventing the deformation of the honeycomb structural body when the honeycomb structural body is extruded.

2 Claims, 9 Drawing Figures

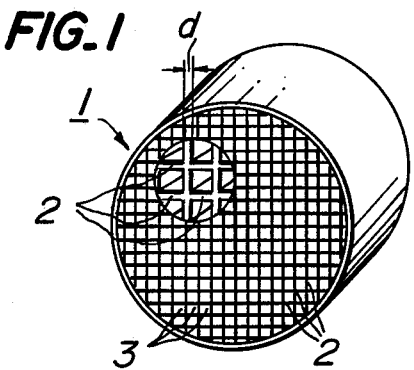
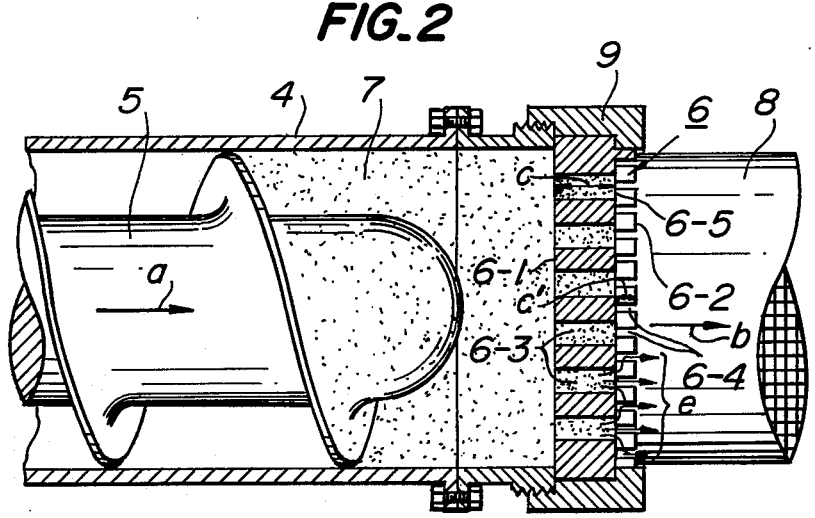
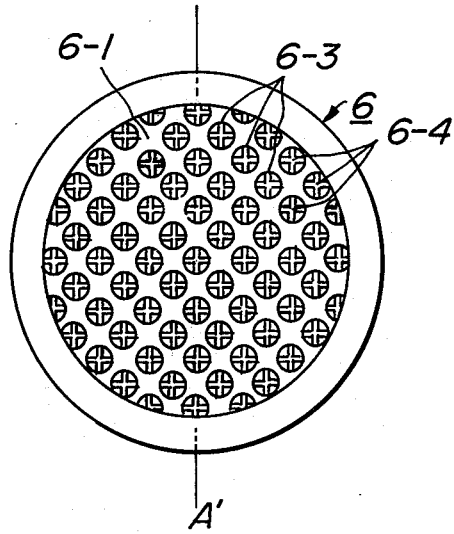
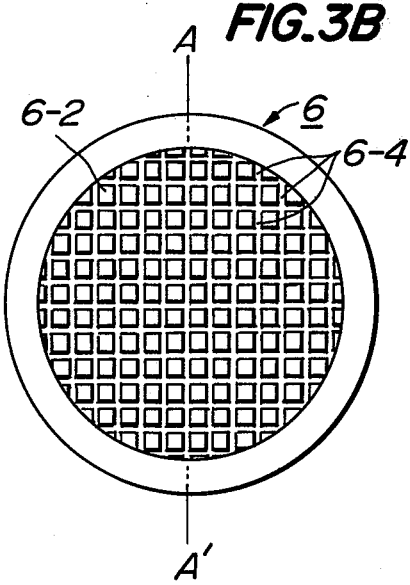

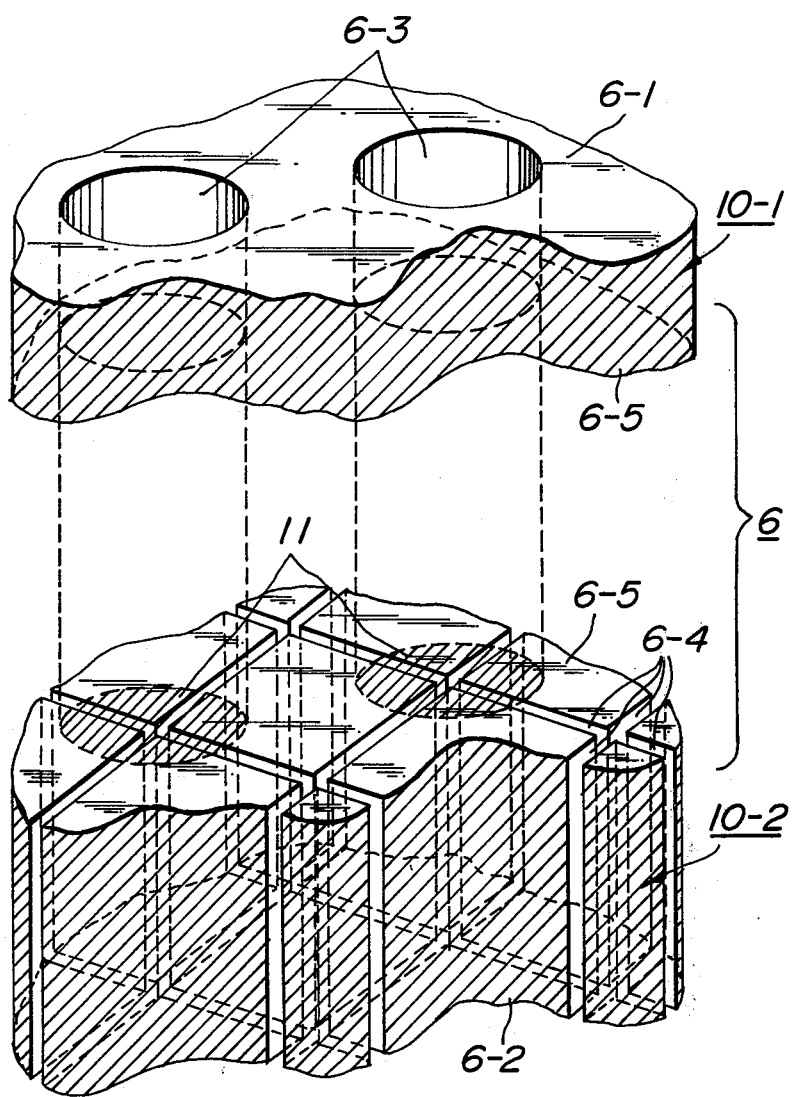

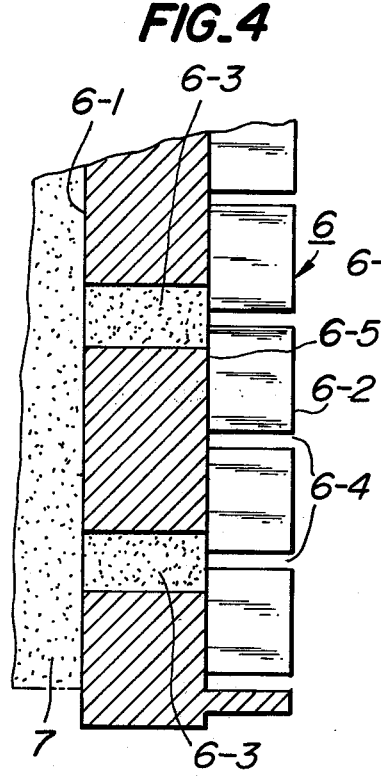
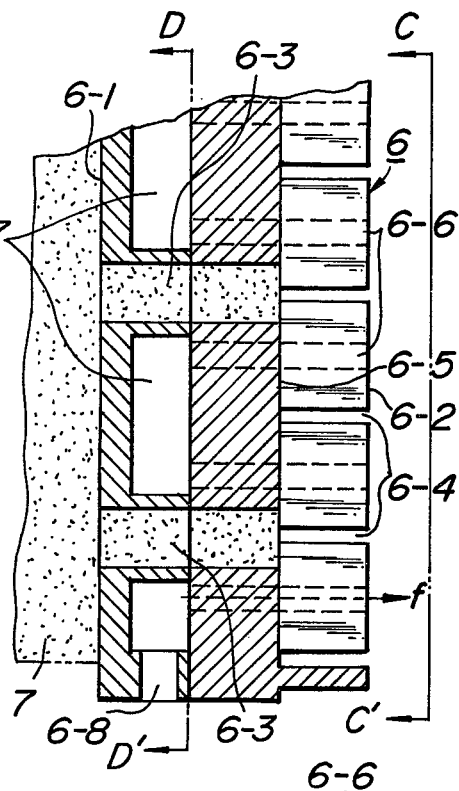
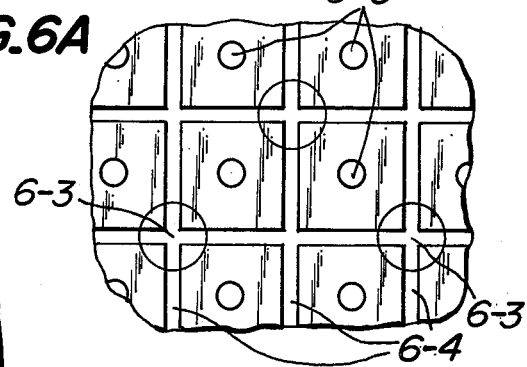
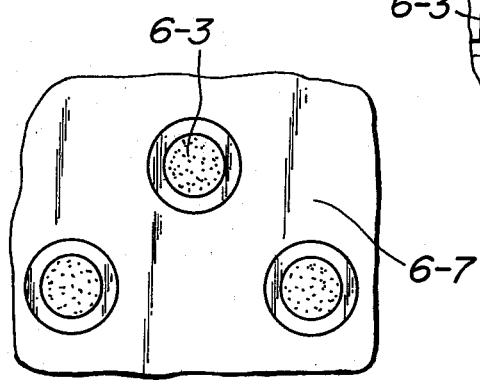

APPARATUS FOR EXTRUDING A HONEYCOMB STRUCTURAL BODY

The present invention relates to a die for extruding a honeycomb structural body, and more particularly relates to a die for extruding a honeycomb structural body which prevents the deformation of the honeycomb structural body on extrusion of the honeycomb structural body.

The purifying member in an exhaust gas-purifying apparatus for automobiles generally has a structural shown in FIG. 1. In FIG. 1, the numeral 1 represents the purifying member, such as a honeycomb structural body, the numeral 2 represents a partition wall, and the numeral 3 represents cells formed by the partition walls and extending through the honeycomb structure 1, the cells being, e.g., square in cross-section. The partition wall 2 is generally made of heat-resistant and corrosion-resistant ceramics and has a thickness of about 0.05–5 mm (d in FIG. 1.).

For a better understanding of the invention, reference is made to the accompanying drawings, in which:

FIG. 1 is a perspective view of a honeycomb structural body for explaining the general elements of that structure, a part of which is enlarged;

FIG. 2 is a front elevational view, partly in section, of a conventional extruder using a die for extruding a honeycomb structural body;

FIGS. 3A, 3B and 3C show one embodiment of conventional die for extruding a honeycomb structural body;

FIG. 4 shows details of the die shown in FIG. 2 for extruding a honeycomb structural body; and FIGS. 5 and 6A and 6B are views for explaining the die for extruding a honeycomb structural body according to the present invention.

A honeycomb structural body to be used as a purifying member of this kind is generally produced by the continuous extrusion by means of an extruder having a structure shown in FIG. 2. In FIG. 2, the numeral 4 represents a cylinder, the numeral 5 represents an extrusion means, for example, a screw which moves in the direction of arrow a shown in FIG. 2 while rotating, and the numeral 6 represents a die for extruding a raw stock 7, for example, a ceramic batch, into a honeycomb structural body 8 composed of cells having a predetermined cross-sectional shape. The raw stock 7 is forcedly fed into a cylinder 4 towards the die 6 by means of the extrusion means 5, and the honeycomb structural body 8 to be used as a purifying member 1 shown in FIG. 1 is extruded from the die 6 in the direction of arrow b shown in FIG. 2. The numeral 9 represents a connecting means which connects the cylinder 4 and the die 6 and holds them together.

The die 6 used in the conventional extrusion apparatus of this kind generally has a structure shown in FIG. 3A when viewed from the cylinder 4 side, and a structure shown in FIG. 3B when viewed from the honeycomb structural body 8 side. The cross-section of the die taken on the line A-A' in FIGS. 3A and 3B has a structure shown in FIG. 2. That is, the die 6 has a plurality of independent feed inlets, for example, circular holes 6-3, which are bored in the die up to a given depth (shown by c in FIG. 2) from its rear surface 6-1 toward surface 6-2, and further has discharge slits 6-4 formed in the die up to a given depth (shown by c' in FIG. 2) from its front surface 6-2 toward surface 6-1, said discharge slits having a cross-sectional shape corresponding to the cross-sectional shape of the cell of the honeycomb structural body 8. The above described circular holes 6-3 and discharge slits 6-4 are communicated to each other and made integral into one body on an imaginary plane 6-5. FIG. 3C is a perspective view of the die 6, which is divided into two parts by the imaginary plane 6-5 for ease of the explanation of the relation between the circular holes 6-3 and the discharge slits 6-4. The die 6 is composed of a first core block 10-1 and a second core block 10-2. In FIG. 3C, the numeral 11, which corresponds to the hatched area in the plane 6-5 of the figure, shows a joint plane of the circular holes 6-3 and the discharge slits 6-4. Other numerals are same as those designated in FIG. 2. In FIG. 3C, the first core block 10-1 is arranged on the plane 6-5 of the second core block 10-2 so that the center line of circular holes 6-3 are positioned at the intersecting point of discharge slits 6-4, forming a die together with the second core block 10-2. That is, the first and second core blocks 10-1 and 10-2 are not practically independent, but circular holes 6-3 are bored from one surface 6-1 of a block and discharge slits are cut from another surface 6-2 of the block to form a die 6.

When a raw stock 7 is forcedly supplied into the thus formed die 6, the raw stock 7 is forcedly flowed in the circular hole 6-3 towards the discharge slit 6-4 side and reaches the joint surface 11 shown in FIG. 3C. The raw stock 7 which has reached the joint surface 11 is then flowed into the discharge slit 6-4 through the joint surface 11. The raw stock 7 passes through the discharge slits 6-4 as shown by the arrow e in FIG. 2 and is extruded from the discharge slits 6-4 to be shaped continuously into the honeycomb structural body 8 corresponding in cross-sectional shape to the discharge slits 6-4.

However, in the above described method for extruding the honeycomb structural body 8, the honeycomb structural body 8 extruded from the die 6 is apt to buckle or bend in its incompletely dried state and deformation occurs. The honeycomb structural body 8 is continuously extruded and therefore air in the cells 3 surrounded by the partition walls 2 in the vicinity of the die 6 for extruding the honeycomb structural body interchanges to the outer air with difficulty, so that the drying cannot be satisfactorily effected and deformation readily occurs.

An object of the present invention is to solve the above described drawback and to provide an apparatus for extruding the honeycomb structural body capable of obtaining a non-deformed honeycomb structural body.

The present invention will be explained with reference to FIGS. 4, 5, 6A and 6B.

FIG. 4 is a partially enlarged view of the die shown in FIG. 2 in order to easily understand the explanation of FIGS. 5, 6A and 6B.

FIG. 5 is a partially enlarged view (corresponding to FIG. 4) of the die for extruding the honeycomb structural body of one embodiment of the present invention corresponding to the die 6 shown in FIG. 2. FIG. 6A is a side view of the die of the present invention taken on the line C-C' in FIG. 5 and FIG. 6B is a side view of the die of the present invention taken on the line D-D' in FIG. 5.

In FIGS. 5, 6A and 6B, the numerals 6, 6-1~6-5 and 7 show elements corresponding to the same numerals in FIG. 4. The numeral 6-6 identifies apertures for flowing gas, such as air, for drying the honeycomb structure, which open at the front surface of the die for extruding the honeycomb structural body, the numeral 6-7 shows a reservoir for the above described drying gas such as air and the numeral 6-8 shows a gas inlet for supplying the drying gas such as air into the gas reservoir 6-7.

As an example of the present invention, the course of extrusion of the honeycomb structural body is similar to that explained with reference to FIGS. 1–3, but in the die for extruding the honeycomb structural body of the present invention, the first block constituting a plurality of feed inlets 6-3 abutting the imaginary plane 6-5 where the feed inlets 6-3 and the discharge slits 6-4 are opened and connected, is divided in a direction cross-secting the feed inlets 6-3 at D-D' plane shown in FIG. 5 and remains the periphery portion of the feed inlet 6-3 in the divided plane to form a gas reservoir 6-7 composed of recess (all the gas reservoirs 6-7 are connected and integrally formed as shown in FIG. 6B). In the other block divided at the above described D-D' plane and provided with the discharge slits 6-4, gas discharge apertures 6-6 independent from the feed inlets 6-3 and the discharge slits 6-4 and connecting to the gas reservoir 6-7 as shown in FIG. 5 and FIG. 6A are provided. Namely, all the die blocks surrounded by the discharge slits 6-4 are provided with gas discharge apertures 6-6 opening at the die front surface 6-2. Furthermore, a gas inlet 6-8 supplying the drying gas such as air to the gas reservoir from the outside and connecting to the gas reservoir 6-7 is provided.

As mentioned above, if the honeycomb structural body 8 extruded from the extrusion die 6 is in an insufficiently dried state where the raw stock 7 is extruded through the extrusion die to continuously form the honeycomb structural body 8, deformation readily occurs, so that if the drying gas such as air is discharged to every die block surrounded by the discharge slits 6-4 at the time the honeycomb structural body is extruded from the extrusion die 6, drying is promoted and deformation is prevented. In order to promote the drying effect and to prevent deformation upon extrusion of the honeycomb structural body in the present invention, as shown in FIG. 5 and FIG. 6B, gas such as air of optimum condition for the drying effect is supplied to the integrally connected gas reservoir 6-7 through the gas inlet 6-8 connecting to the gas reservoir 6-7. That is, the drying gas is discharged into every cell 3 surrounded by the partition walls 2 of the extruded honeycomb structural body from the gas reservoir 6-7 by passing the gas through discharge apertures 6-6 opening at the front surface 6-2 of the die at each die block surrounded by the discharge slits 6-4 and connecting to the gas reservoir 6-7. Thus, at the same time when the raw stock 7 is extruded from the discharge slits 6-4 of the extrusion die 6, the extruded honeycomb structural body 8 is immediately dried by the drying gas such as air discharged from the gas discharge apertures 6-6 and deformation is prevented. Gas supplied from the gas inlet 6-8 passes to the discharge apertures 6-6 through the gas reservoir 6-7 and is discharged from the openings of the gas discharge apertures 6-6 at the front surface of the die but if there is difference in the gas flow resistance to the openings at the front surface of the die of each of gas discharge apertures 6-6 from the gas inlet 6-8, the amount of the gas flow passing through each gas discharge aperture 6-6 becomes ununiform. Accordingly, by providing the gas reservoir 6-7 (having such a sufficient volume that the pressure at each portion of the gas reservoir 6-7 is not influenced by the amount of gas flow passing through the gas discharge apertures 6-6) between the gas inlet 6-8 and the gas discharge apertures 6-6, gas such as air supplied from the gas inlet 6-8 is once storaged in the gas reservoir 6-7 and the pressure at the connecting openings of every gas apertures 6-6 at the gas reservoir 6-7 is maintained at a given value and it is possible to make the flow amount of gas passing through the gas apertures 6-6 uniform.

As mentioned above, according to the present invention, in the course of extruding the honeycomb structural body, when the raw stock is extruded from the extrusion die to form the honeycomb structural body, the drying gas such as air is flowed out simultaneously from the front surface of the die to promote the drying from the inner portion of the honeycomb structural body and to prevent deformation, whereby a honeycomb structural body having uniform shape can be obtained.

What is claimed is:

1. In a die apparatus for extruding a honeycomb structural body comprising a second core block having discharge slits of a cross-sectional shape corresponding to the cross-section of the honeycomb, said slits having a given depth toward the rear surface of the die from the front surface of the die, and a first core block wherein a plurality of independent feed inlets are formed toward the front surface side of the die from the rear surface of the die and connect to the discharge slits, both said blocks being constituted integrally, an improvement comprising that the first core block being divided in the direction which cross-sects the feed inlets to provide a gas reservoir composed of a recess formed by remaining the periphery portion of a plurality of feed inlets, and gas discharge apertures opening at the front surface of the die and perforating the second block to flow gas from the gas reservoir through said gas discharge apertures.

2. The apparatus for extruding the honeycomb structural body as claimed in claim 1, wherein the gas reservoir connecting to the gas discharge apertures is supplied with gas from gas inlets provided on the first core block.

* * * * *